Feb. 11, 1969     F. L. PARSONS     3,427,078
ENDLESS TRACK WITH HOLLOW INFLATABLE TREADS
Filed Oct. 20, 1966     Sheet 1 of 4

INVENTOR
FREDERICK L. PARSONS
BY
HIS ATTORNEYS

Feb. 11, 1969 F. L. PARSONS 3,427,078
ENDLESS TRACK WITH HOLLOW INFLATABLE TREADS
Filed Oct. 20, 1966 Sheet 2 of 4
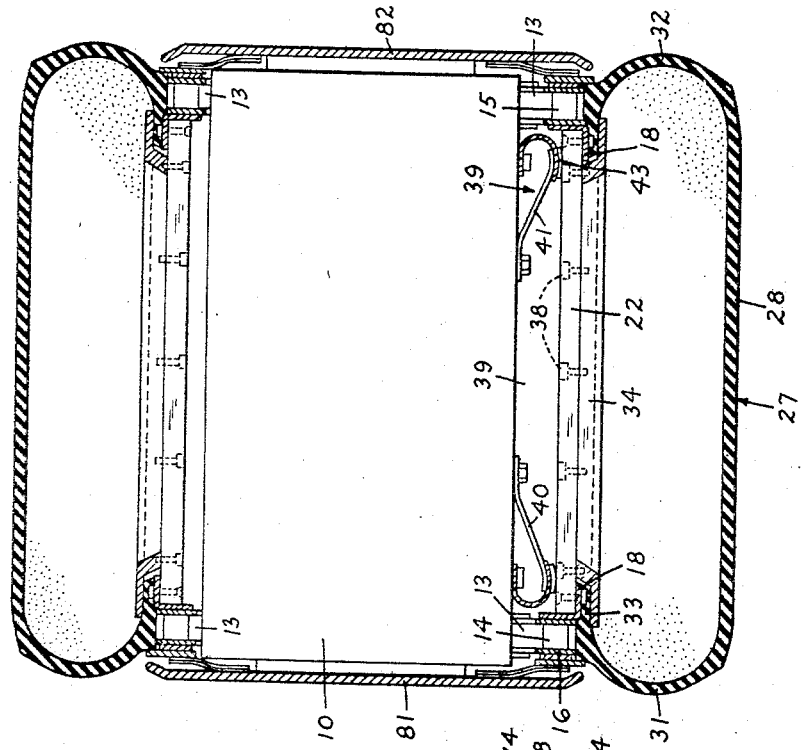
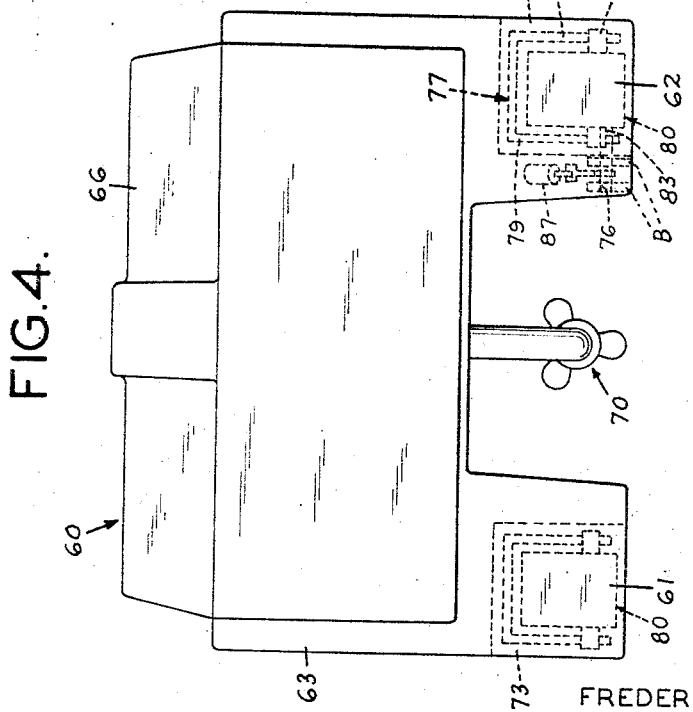
INVENTOR
FREDERICK L. PARSONS
BY
HIS ATTORNEYS

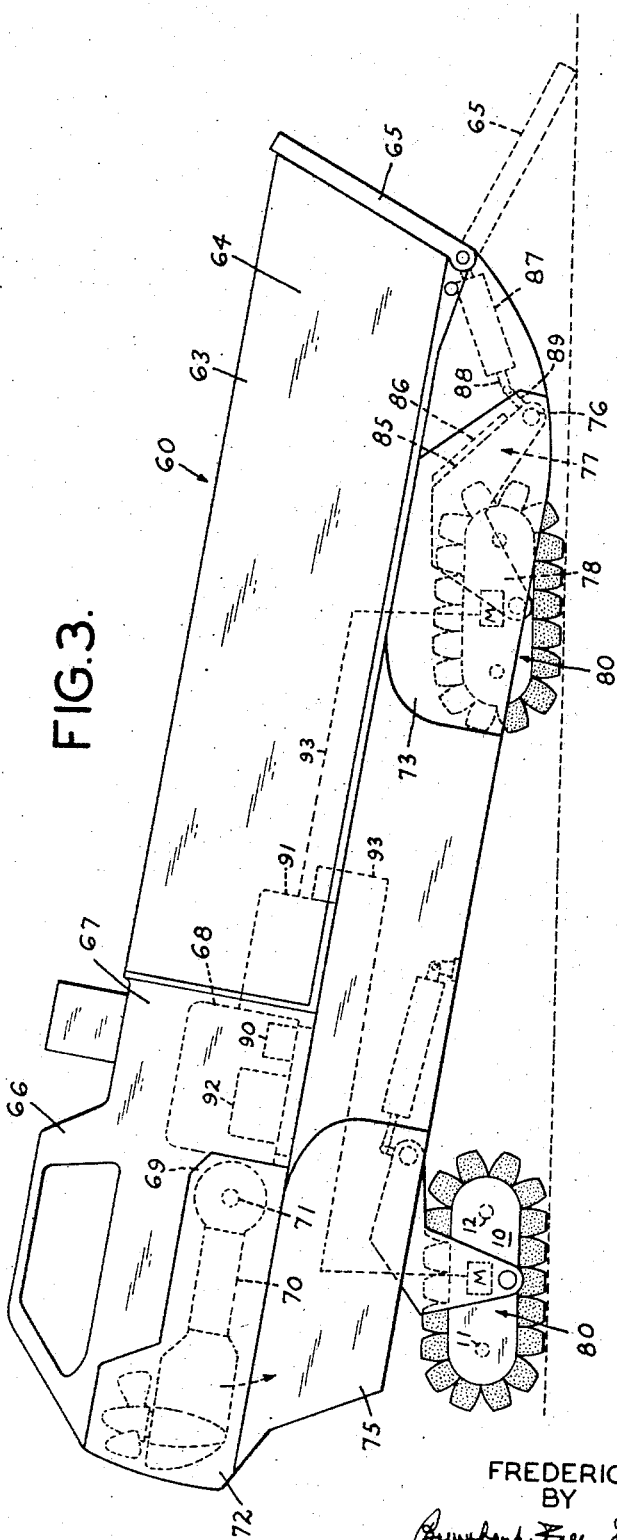

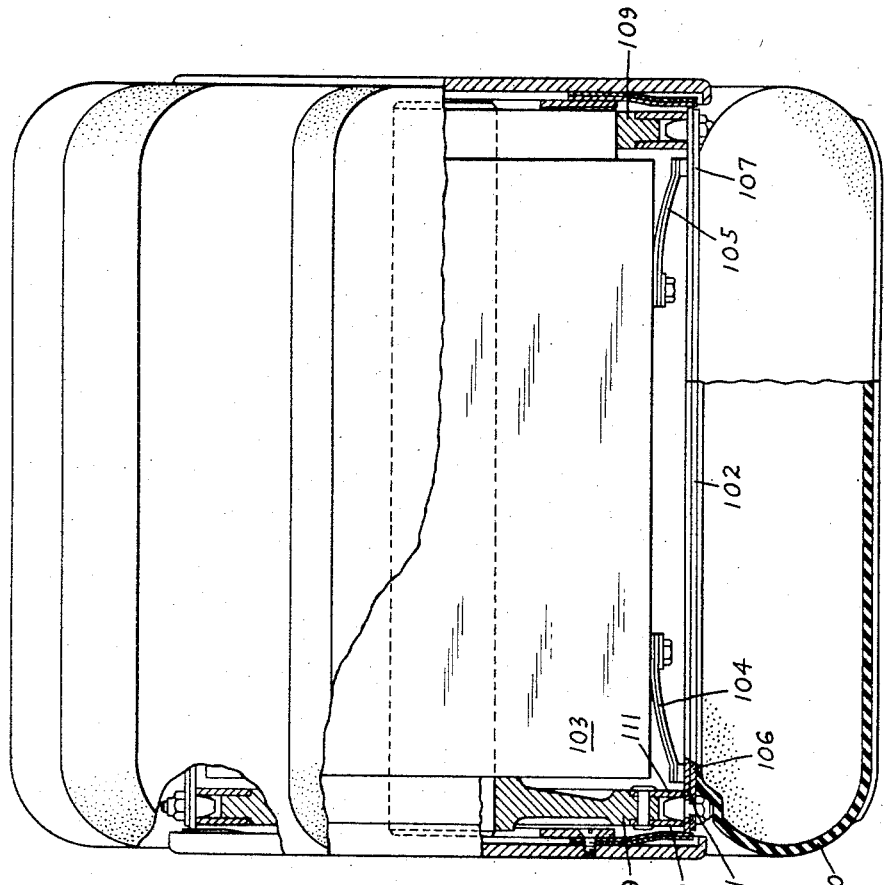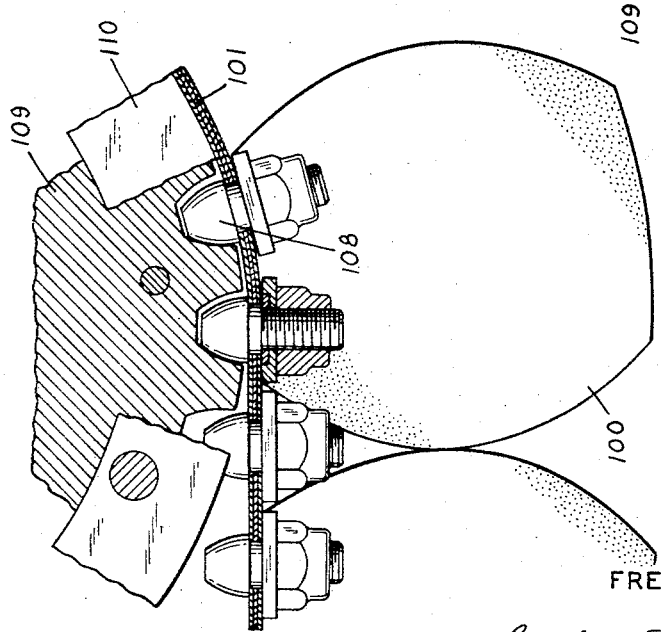

United States Patent Office 3,427,078
Patented Feb. 11, 1969

3,427,078
ENDLESS TRACK WITH HOLLOW INFLATABLE TREADS
Frederick L. Parsons, 759 Morningside Road, Ridgewood, N.J. 07450
Filed Oct. 20, 1966, Ser. No. 588,040
U.S. Cl. 305—14      8 Claims
Int. Cl. B62d 55/20; B63h 1/34; B60c 5/06

ABSTRACT OF THE DISCLOSURE

A vehicle track wheel made up of a plurality of elongated, hollow treads made of resilient material and carried in a closed path and including a pair of flexible tread carriers driven in a closed path, a pressure chamber above the treads in contact with the ground, a pair of stationary end seals extending in fore and aft directions above cooperating sealing surfaces carried by the flexible carriers, the leakage from the chamber decreasing the friction between the stationary and moving sealing surfaces, and a plurality of rigid, transverse connections extending between and carried by the flexible carriers to which portions of the tread are mounted.

---

This invention relates to vehicle wheels and tires, and more particularly to improvements in vehicle track wheels suitable for use on heavy duty vehicles and in off-highway operation of such vehicles.

In recent years the pneumatic tires used on heavy duty vehicles, such as road-building equipment and the like used on rough and swampy ground, are very large to provide the ground contact necessary to support these vehicles and allow them to maneuver. Many such tires are six feet or more in diameter and are correspondingly heavy, expensive and difficult to mount and house on the vehicles on which they are used.

Other low pressure tires or air bags also have been made in smaller diameters and of wide ground-contacting area, but these tires are of limited utility for the reason that they lack maneuverability.

Endless tracks are used on many types of vehicles such as tractors, tanks and snow vehicles but these tracks are heavy, complex, and if used on the roads wear rapidly and damage the roads unless the tracks are provided with rubber inserts or the like.

In accordance with the present invention, a pneumatic track wheel is provided which is composed of a number of elongated hollow inflatable members mounted in side by side relation to form an endless band carried on a suitable frame or truck so that they can be driven in an endless path like an endless track, means being provided to inflate the members on the track in contact with the ground to a low pressure to improve the riding comfort and roadability of the vehicle equipped with such tracks.

More particularly, the new track wheel is of such dimensions that the road-contacting area thereof is comparable to that of a pneumatic tire of much greater size but occupies much less space than such a tire and provides roadability much better than is possible with an endless track. The size of the track wheel is such as to enable it to be mounted, for example, in an amphibious vehicle for retraction and extension to enable the vehicle to be operated efficiently in water and also enable it to run up on a beach to unload cargo without danger of sinking into sand or mud and being bogged down therein. Moreover, despite the smaller over-all size of the new track wheel, it can be used on soft or marshy ground to provide the same load-supporting characteristics as the larger vehicle tires which are commonly used at the present time on heavy duty off-highway vehicles.

A particular feature of the new track wheel is the use of inflating means in the track which supplies air only to those sections of the track in contact with the ground while also serving as a low friction air bearing for supporting the vehicle load on the portion of the track in engagement with the ground. Inasmuch as the inflatable tread sections of the track wheel are separate from each other, one or more of the tread sections can be damaged without affecting the operation of the other sections while providing an adequate load-supporting area.

For a better understanding of the present invention, reference may be had to the accompanying drawings, in which:

FIGURE 2 is an end elevational view and partial cross-sectional view of the track wheel;

FIGURE 3 is a side elevational view partially broken away of an amphibious vehicle including the new track wheels embodying the invention;

FIGURE 4 is a front elevational view of the vehicle;

FIGURE 5 is an end elevational and partial sectional view of a modified type of track wheel embodying the invention; and FIGURE 6 is a side elevational view of a portion of the track wheel shown in FIGURE 5 with parts broken away to disclose details thereof.

Figure 1:
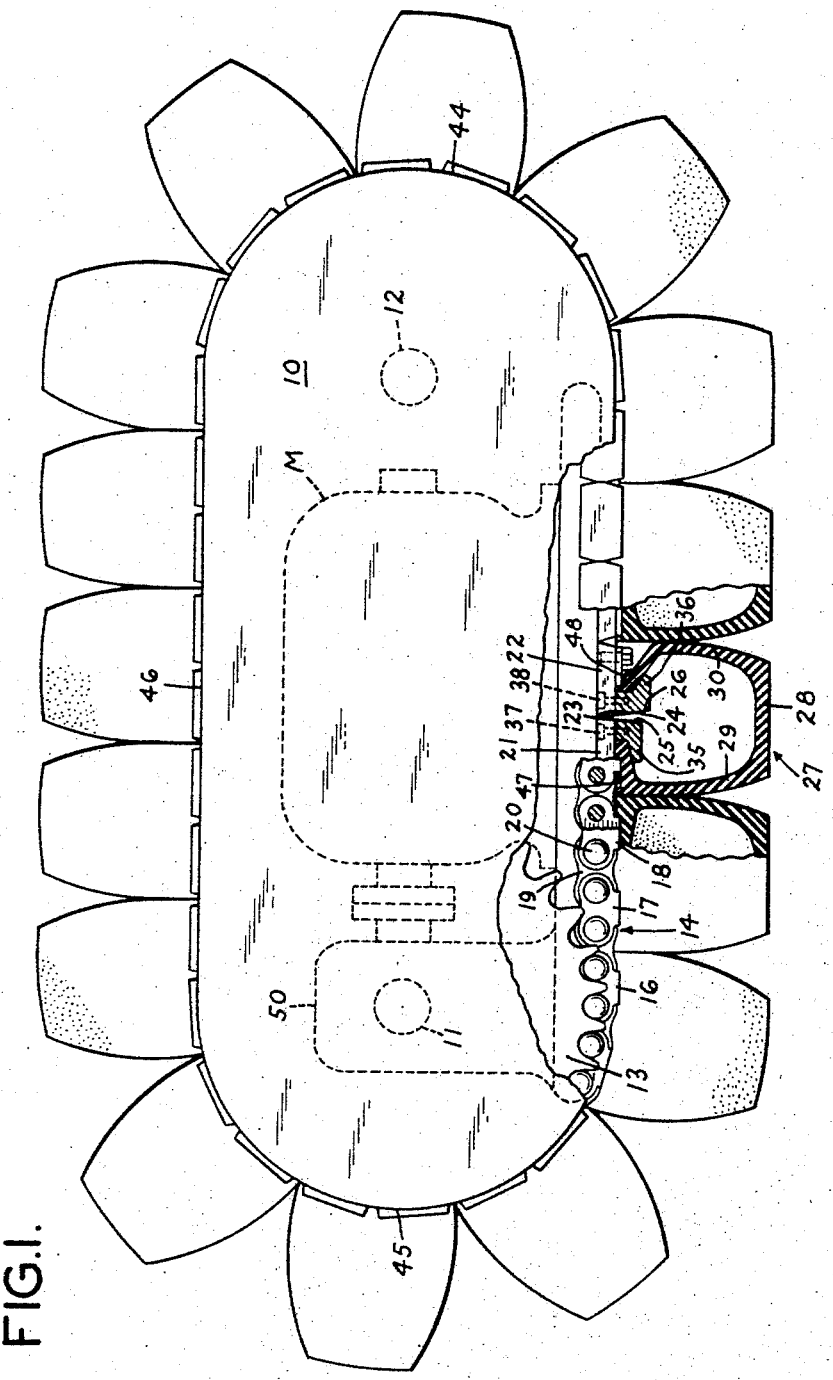
FIGURE 1 is a view in side elevation and partly broken away of a typical track wheel embodying the present invention.

The form of track wheel illustrated in FIGURES 1 and 2 is a self-contained propulsion unit which includes a central hollow compartment 10 forming a frame having shafts 11 and 12 journalled in it and carrying at their outer ends sprockets 13 which mesh with a pair of chains 14 and 15 extending endlessly around the sprockets and outside of the frame compartment 10. Each chain includes links 16, 17, etc., each of which has and inwardly extending angle member 18 fixed thereto and interposed conventional links, connected by means of pivots 20. To each pair of angle members 18 on the links 16, 17 etc. are connected transverse bars 21 and 22 which span the space between the chains 14 and 15 outside the frame 10 and have their inner edges 23 and 24 in closely spaced relation. The edges 25 and 26 of each of the bars are mitered or inclined to allow flexing of the chains and the bars either inwardly or outwardly as may be required, the upper surfaces of the bars lying substantially in the plane of the axes of the pivots connecting the links of the chains.

Connected to each pair of the bars 21 and 22 is an elongated hollow resilient tread member 27 which has a ground-contacting surface 28, normally bowed side walls 29 and 30, rounded ends 31 and 32 and an inwardly projecting flange 33 at the top around a central opening 34 in the top of the tread member. It will be understood that the tread members may be provided with carcasses of suitable ply fabric and if desired, the surface 28 may be provided with a tread of an abrasion-resistant elastomer shaped for maximum ground holding. The flange or rim 33 around the open top of the tread member is secured to the bars 21 and 22 by separate flange rim members 35 and 36 which are secured to the bars 21 and 22, respectively, by means of counter-sunk screws 37 and 38 enabling removal and replacement of the rims. The rims engage the longitudinal edges and extend about one-half way around each end of the flange 33 at the opposite ends of the tread member 27 so that the flexibility of the chains is not impaired greatly.

Air is admitted between the edges 23 and 24 of the bars 21 and 22, into the tread members 28 for inflating them at low pressure. A manifold or chamber 39 is formed on the bottom of the frame 10 and can be supplied with air under pressure from a suitable exterior source, such as an engine driven compressor or blower or air tank and compressor on the vehicle with which the track wheels are used. The chamber 39 may be formed of flexible material, such as rubberized fabric or the like, and spring plates 40 and 41 are provided to urge the flexible sides and ends of the chambers into sliding contact with the upper surfaces of the bars 21 and 22. To reduce wear, thin resilient wear plates 43 are secured to the lower edges of the chamber and slidably engage the bars 21 and 22. The chamber is not in complete sealing relation to the bars 21 and 22, but inasmuch as the air pressure which is supplied to the treads 27 may be relatively low, e.g., one to ten pounds per square inch, absolute air tightness is not required or desired. Leakage of air between the plates 43 and the bars 21 and 22 serves to reduce friction between them and, in fact, forms an air bearing facilitating movement of the bars 21 and 22 and the treads 27 attached thereto. The chamber 39 extends only along that portion of the track which is in contact with the ground so that only the tread members 27 in contact with the ground are inflated or need to be inflated. Air can escape from the other tread members during their movement along the curved portions 44, 45 and the upper straight flight 46 of the path transversed by the chains 14 and 15 and the tread members thereon.

Inasmuch as the individual tread members 27 when being subjected to the load of a vehicle are in side to side engagement, the open tops thereof cannot spread and become detached from the respective bars 21 and 22. Moreover, the treads are securely anchored by reason of the fact that the angle members 18 are received in recesses 47 and 48 in the top or flange 33 of the tire.

The sprockets 13 and 14 and the shafts 11 and 12 can be driven in any suitable way such as by means of an internal combustion engine and gearing, hydraulic, pneumatic or electric motors to propel a vehicle on which the track wheels are mounted. By way of example, and as shown in FIGURE 1, a reversible electric motor M is mounted inside the frame chamber 10 and coupled to the shaft 11 by means of a reducing gear 50. In this way, the shaft 11 and the sprockets 13 thereof are driven in a direction to move the track wheel around the frame 10 and propel the track wheel.

The motor M may be of the sealed, watertight or water immersible type and the frame 10 may also be watertight so that the track wheel can be used under wet conditions or even when fully immersed in water. Power is supplied to the motor from a motor generator on the vehicle and each of the track wheels may be propelled by its separate motor, thereby enabling steering control by operating the motors independently or at different speeds under the control of the operator of the vehicle.

An example of the use of the track wheels is illustrated in FIGURES 3 and 4. As shown therein, a typical amphibious landing vehicle 60 has a pair of flotation pontoons 61 and 62 to enable the vehicle to be used on water. The forward portion of the hull 63 of the vehicle is provided with a cargo compartment 64. A hinged loading door and ramp 65 closes the front end of the cargo compartment 64. A cabin 66 for the operator is mounted at the rear of the hull and includes a compartment 67 in which an internal combustion engine 68 is housed. The engine is couped by means of a transmission 69 to an outboard type of propeller unit 70 which is movable around a pivot 71 between a retracted inoperative position in a compartment 72 below the cabin 66 or a downward operative position, as shown in FIGURE 4, for propelling the craft. The engine and propeller unit form an inboard-outboard drive of known type.

The forward parts of the pontoons 61 and 62 contain compartments 73 and 74, open at their bottoms and the rear of the pontoons also include compartments 75 also open at their bottoms and, if desired, at their rear ends. Each compartment 73 to 75 contains a track wheel. Only one of the supports for the track wheel will be described.

Fixed to a shaft 76 extending transversely through a compartment 73 is a mounting lever 77 having generally L-shaped arms on plates 78 and 79 disposed on opposite sides of a track wheel unit 80 of the type disclosed in FIGURES 1 and 2. Cover plates 81 and 82 are fixed to opposite sides of the frame 10, and have spring biased seals 83 to prevent dirt from clogging the chains 14 and 15. Stub shafts or a through shaft 84 on the unit 80 pivotally engage the trailing ends of the arms 78 and 79. For strengthening purposes, the arms 78 and 79 are connected along a flat edge 85 thereof by means of a reinforcing plate 86. Each of the track wheel units 80 can be retracted into or projected out of its respective compartment in the pontoon by means of a hydraulic cylinder 87 having the connecting rod 88 thereof connected to a lever arm or crank 89 extending substantially radially from the shaft 76 which is supported in bearings B in the pontoon 62. Hydraulic power for projecting or retracting the piston rod is supplied by means of a hydraulic pump 90 driven by the engine 68. Selector valves of conventional type (not shown) are mounted in the cabin 66 of the vehicle to enable one or all of the track wheel units 80 to be extended from their compartments. For example the rear units 80 may be projected while the front units are retracted to facilitate loading and unloading of the cargo compartment 64. All of the units 80 may be driven by means of a generator 91 driven by the engine 68 to enable the vehicle to crawl on to a landing beach or the like. Air is supplied for inflating the ground-contacting tread members by a compressor 92 driven by the engine 68 or an electric motor driven by the generator 91. Flexible conduits connect the compressor 92 to the chambers 39 of the track wheels and flexible waterproof cables 93 supply power from the generator 91 to the motor M of the track wheels. Inasmuch as power is not supplied to the propeller unit 70 while the vehicle is being operated on land, the full power of the engine 68 is available for driving the generator, compressor and hydraulic pumps. With a vehicle of this type, to provide steering control of the vehicle while on land the units 80 may be mounted with a conventional steering geometry.

Other adaptations of the track units are possible, such as mounting them on parallel linkages instead of pivotally, and only two such units 80 may be used on tractor-type vehicles, if desired. The units 80 can, of course, be driven directly and steered by the vehicle engine through suitable clutches and gearing conventional in such tractors.

Due to the low pressure operation of the tread members 27, as indicated above, puncturing or damaging of several of the tread members will not render the unit inoperative, although somewhat decreasing its maneuvering and load-carrying ability. In any event, with the track wheel units embodying the present invention, it is possible to provide a large ground-contacting area with a relatively small unit inflated at low pressures so that heavy loads can be carried.

FIGURES 5 and 6 disclose a modified track wheel of durable nature not requiring chains for supporting the inflatable tread members. As best shown in FIGURE 6, the inflatable tread members 100 are mounted on an endless flexible band 101 which may be formed by winding a strip of metal, such as thin spring steel, in a plurality of convolutions around a mandrel and welding or brazing each free end of the strip to an adjacent convolution. Flexing of the laminated band to less than its elastic limit will not weaken or break it over prolonged periods of time. The tread members are attached to the band by means of rims (not shown) similar to those described above, and the band is provided with transverse slots or slits 102 to enable air to be introduced into the ground-contacting tread members 100 from the air chamber 103 which is provided with resiliently biased longitudinal sealing strips 104 and 105 engaging continuous edges 106 and 107 of the band 101 outwardly of the slits 102 and other sealing strips (not shown) extending transversely of the band 101 at opposite ends of the chamber 103.

A row of dome-like studs 108 forming teeth are attached to the band 101 along each edge thereof for engagement with pairs of sprockets 109 at each end of the track wheel frame, the sprockets having annular rims 110 and 111 riveted or otherwise secured thereto to guide the studs into the recesses in the sprockets and also to serve as rolls to engage and support the edges of said bands.

Driving means similar to that described in connection wih FIGURES 1 to 4 may be used to drive the sprockets 109, and air is supplied to the air chamber 103 by a suitable compressor.

This form of wheel is resistant to damage for it does not include chains which require lubrication or which may be damaged by abrasion under dusty, muddy or other unfavorable conditions.

I claim:

1. A vehicle track wheel comprising a plurality of separate elongated, hollow treads made of resilient material and extending transversely of the direction of travel of the vehicle, each of said hollow treads having an opening at the top, a pair of spaced apart endless flexible tread carriers driven in a closed path to carry the treads, rotatable means meshing with each of the endless tread carriers and guiding the treads for movement in a closed path having a straight lower flight, frame means supporting said rotatable guide means, a pressure chamber above said lower flight and in communication with the openings in the tops of the lower flight treads for supplying fluid pressure to the interiors of the treads, said chamber being defined in part by a pair of stationary end seals extending in fore and aft directions above the portions of the flexible carriers forming the lower flight, cooperating moving sealing surfaces carried by each of the flexible carriers and engageable with the stationary end seals of said chamber, leakage therebetween from the chamber decreasing friction between the stationary and moving sealing surfaces, and a plurality of rigid transverse connections extending between and carried by the flexible carriers to which portions of the treads intermediate the flexible carriers are mounted.

2. A vehicle track wheel as set forth in claim 1 in which the transverse connections are closely spaced side by side and their upper surfaces form the moving sealing surfaces.

3. A vehicle track wheel as set forth in claim 1 in which a pair of transverse connections are closely spaced side by side and extend across the opening at the top of each tread, and means connecting the tread with the said pair of transverse connections, the passage between the said paid of transverse means establishing the communication between the pressure chamber and the interior of the hollow tread.

4. A vehicle track wheel as set forth in claim 1 in which the treads are open to the atmosphere from the end of the lower flight until they return to the beginning of the lower flight.

5. A vehicle track wheel as set forth in claim 1 in which the flexible carriers are chains and in which the transverse connections connect corresponding links of the chains.

6. A vehicle track wheel as set forth in claim 1 in which the transverse connections include pairs of bars closely spaced, each bar including a depending portion which engages the transverse edge of the opening in the tread so that the passage between the chamber and the interior of the tread is defined between said bars.

7. A vehicle track wheel comprising a plurality of elongated, hollow, flexible treads, each having a bottom, ends and sides and a top with an opening therein, a pair of spaced apart flexible carriers connecting said treads in side by side relation in an endless band, rotatable guides meshing with and guiding the flexible carriers for movement in a closed path having a substantially straight lower flight, frame means supporting said rotatable guides, a chamber in said frame means having an opening communicating with the openings in the tops of a plurality of said treads, means for supplying air under pressure to said chamber and said treads in communication therewith, a plurality of pairs of bars extending between said pair of flexible carriers and movable therewith, means carried by one bar of each pair connecting a side edge and portions of opposite end edges of the opening in the tread and means carried by the other bar of the pair connecting the other side edge and portions of opposite end edges of the opening in the same tread, the passage between the bars establishing the communication between said chamber and the interior of the tread.

8. A vehicle track wheel as set forth in claim 7 in which the upper surfaces of the pair of bars form moving sealing surfaces, and including fore and aft extending stationary sealing surfaces forming parts of the said chamber.

References Cited

UNITED STATES PATENTS

| | | | |
|---|---|---|---|
| 3,236,525 | 2/1966 | Barber | 180—41 X |
| 3,299,978 | 1/1967 | Sponsler | 180—9.52 |
| 2,359,586 | 10/1944 | Sayler | 305—35 |
| 2,413,850 | 1/1947 | Swennes | 115—1 |
| 2,416,679 | 3/1947 | Curtis | 305—34 X |
| 2,900,210 | 8/1959 | Parsons | 305—34 X |
| 3,074,764 | 1/1963 | Bertelsen | 305—34 X |
| 3,170,533 | 2/1965 | Fewel | 305—34 X |
| 3,244,458 | 4/1966 | Frost | 305—34 |

RICHARD J. JOHNSON, *Primary Examiner.*

U.S. Cl. X.R.

115—1; 305—34; 180—9.52